(12) United States Patent
Yamanaka

(10) Patent No.: US 7,391,708 B2
(45) Date of Patent: Jun. 24, 2008

(54) OPTICAL DISC AND METHOD FOR REPRODUCING THE SAME

(75) Inventor: Yutaka Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 15 days.

(21) Appl. No.: 10/514,169

(22) PCT Filed: May 13, 2003

(86) PCT No.: PCT/JP03/05921

§ 371 (c)(1),
(2), (4) Date: Nov. 12, 2004

(87) PCT Pub. No.: WO03/107333

PCT Pub. Date: Dec. 24, 2003

(65) Prior Publication Data

US 2005/0174916 A1 Aug. 11, 2005

(30) Foreign Application Priority Data

May 13, 2002 (JP) .............................. 2002-136898

(51) Int. Cl.
G11B 7/24 (2006.01)
G11B 7/00 (2006.01)
(52) U.S. Cl. .................. 369/275.3; 369/275.4; 369/100
(58) Field of Classification Search ................ 369/100, 369/13.03, 13.56, 275.3, 275.4
See application file for complete search history.

(56) References Cited

U.S. PATENT DOCUMENTS

| | | | | |
|---|---|---|---|---|
| 4,940,618 A | * | 7/1990 | Hamada et al. ............. | 428/64.7 |
| 5,132,953 A | * | 7/1992 | Matsubayashi ........... | 369/44.37 |
| 5,274,623 A | * | 12/1993 | Usami et al. .............. | 369/275.1 |
| 5,371,722 A | * | 12/1994 | Yoshimura et al. ....... | 369/13.02 |
| 5,548,573 A | * | 8/1996 | Takeuchi .................... | 369/116 |
| 5,592,446 A | * | 1/1997 | Saitoh et al. ............. | 369/44.27 |
| 5,978,336 A | | 11/1999 | Mine et al. | |

(Continued)

FOREIGN PATENT DOCUMENTS

CN 1140304 A 1/1997

(Continued)

OTHER PUBLICATIONS

Japanese Office Action dated Feb. 14, 2007 with partial English translation.

(Continued)

Primary Examiner—Thang V. Tran
Assistant Examiner—LaTanya Bibbins
(74) Attorney, Agent, or Firm—McGinn IP Law Group, PLLC

(57) ABSTRACT

The present invention provides a technique for improving reliability of reading header information. The optical disk is composed of a recording track. The recording track includes a data recording region in which recording pits are formed for recording data, and a header region in which pre-pits are formed for recording header information identifying said data recording region. Said recording pits have a reflectance smaller than that of a space in which said recording pits are not formed. Said recording pits and said pre-pits are formed so that an amplitude (dynamic range) of a level of an optical signal reflected from said header regions is larger than that of an optical signal reflected from said data recording regions.

13 Claims, 8 Drawing Sheets

U.S. PATENT DOCUMENTS

| | | | |
|---|---|---|---|
| 6,229,786 B1 * | 5/2001 | Miyamoto et al. | 369/275.4 |
| 6,330,392 B1 | 12/2001 | Nakatani et al. | |
| 6,587,417 B2 * | 7/2003 | Okamoto et al. | 369/59.22 |
| 6,628,584 B1 | 9/2003 | Heemskerk et al. | |
| 6,636,461 B2 | 10/2003 | Tsukada et al. | |
| 6,657,946 B2 * | 12/2003 | Okubo | 369/275.2 |
| 6,707,785 B1 * | 3/2004 | Kato | 369/275.3 |
| 6,728,186 B2 | 4/2004 | Weijenbergh et al. | |
| 6,904,008 B2 | 6/2005 | Kawashima et al. | |
| 7,085,221 B2 | 8/2006 | Lee et al. | |
| 7,196,992 B2 | 3/2007 | Kim | |
| 7,206,270 B2 | 4/2007 | Kuroda | |
| 7,313,066 B2 | 12/2007 | Hwang et al. | |
| 2002/0136134 A1 | 9/2002 | Ito et al. | |
| 2003/0067859 A1 | 4/2003 | Weijenbergh et al. | |
| 2005/0141351 A1 | 6/2005 | Yamanaka | |

FOREIGN PATENT DOCUMENTS

| | | |
|---|---|---|
| CN | 1166671 A | 12/1997 |
| EP | 0 467 716 A2 | 1/1992 |
| EP | 1 083 748 A2 | 3/2001 |
| EP | 1 158 497 | 11/2001 |
| JP | 58-73026 | 5/1983 |
| JP | 58-102347 | 6/1983 |
| JP | 59-96546 | 6/1984 |
| JP | 62-28944 | 2/1987 |
| JP | 62028944 A | 2/1987 |
| JP | 1-258243 | 10/1989 |
| JP | 9-274770 | 10/1997 |
| JP | 2000-311343 | 11/2000 |
| JP | 2000-339690 | 12/2000 |
| JP | 2001-57029 | 2/2001 |
| JP | 2001-110055 | 4/2001 |
| JP | 2001-202621 | 7/2001 |
| JP | 2001-291245 | 10/2001 |
| JP | 2001-312879 | 11/2001 |
| JP | 2002-208139 | 7/2002 |
| JP | 2003-331430 | 11/2003 |
| JP | 2005-310321 | 11/2005 |
| WO | WO 03/075265 A2 | 9/2003 |

OTHER PUBLICATIONS

European Search Report dated Mar. 2, 2007.
European Search Report dated Aug. 1, 2007.
European Office Action dated Dec. 11, 2007.
Office Action dated Jan. 15, 2008.
Office Action dated Jan. 15, 2008.

* cited by examiner

OPTICAL DISC AND METHOD FOR REPRODUCING THE SAME

TECHNICAL FIELD

The present invention is related to optical recording media and methods of reading the same, more particularly to recordable or rewritable optical recording media and methods of reading the same.

BACKGROUND ART

Recordable or rewritable optical disks have now become popular. CD-Rs (Compact Disc Recordable) and CD-RWs (Compact Disc Rewritable) are typical recordable or rewritable optical disks. In recent years, DVD-Rs (Digital Versatile Disk) and DVD-RWs (DVD ReWritable), which have recording capacities larger than CD-Rs and CD-RWs, are commercially available.

Recording data onto recordable optical disks is often achieved by phase change recording. Phase change recording involves partially changing a recording layer made of phase change recording material in quality through irradiating a laser beam, and thereby forming recording pits thereon. Irradiating a laser beam increases the temperature of the irradiated portions. The temperature increase changes the irradiated portions in quality, and thereby alters the reflectance of the irradiated portions. The irradiated portions, with their reflectances altered, are used as recording pits. The reflectances of the irradiated portions may be decreased or increased.

Phase change recording designed to decrease the reflectance of recording pits is preferable from the viewpoint of the compatibility between recordable optical disks and read-only optical disks (namely, CD-ROMs). CD-ROMs is designed to record data thereon by using pre-pits, whose reflectances are reduced by embossing. Recording pits on recordable optical disks, which have reduced reflectances, exhibit the same effect as the pre-pits on CD-ROMs. Therefore, recordable optical disks can be designed so as to have the compatibility with the read only optical disks (namely, CD-ROMs).

Phase change recording designed to increase the reflectance of recording pits, on the other hand, is advantageous for improving an S/N ratio of an optical signal reflected by optical disks. In most recordable optical disks, the size of the region where recording pits are formed is larger than that of a space (namely, the portions except the region where recording pits are formed) Optical disks that have the decreased reflectance in the space and the increased reflectance in the recording pits reduce the average of levels of reflected light beams, and thereby effectively improve the S/N ratio. The improvement in the S/N ratio is commercially desirable because the improvement of the S/N ratio allows the improvement of the recording density, namely, the increase in the amount of recordable data for a single optical disk.

FIG. 1 is a plan view of an optical disk 101 for phase change recording designed to increase the reflectance of recording pits. A spiral recording track 104 is formed on the optical disk 101. The recording track 104 is divided into sectors each having a predetermined sector length. Each sector contains header information (or format information) including the sector address at the head portion. The portions where the header information is recorded are referred to as header regions 105. User data are recorded in the remaining portions of the sectors. The portions where the user data are recorded are referred to as data recording regions 106.

FIG. 2 shows the cross sectional structure of the optical disk 101. The optical disk 101 includes a transparent substrate 103 and a recording layer 102 covering the transparent substrate 103. The recording layer 102 is made of phase change recording material which has a reduced reflectance in the crystalline phase compared to that in the amorphous phase.

The data recording regions 106 are provided with recording pits 111 corresponding to the user data in the recording layer 102. A light beam used for data reproduction is transmitted across the transparent substrate 103 to reach the recording layer 102, and is reflected by the recording layer 102. A solid line in FIG. 1 indicates the reflection of the light beam by a recording pit 111, and a broken line indicates the reflection of the light beam by a space 112 of the recording layer 102.

The recording pit 111 is the portion exhibiting the amorphous phase within the recording layer 102, and the space 112 is the portion exhibiting the crystalline phase. This configuration makes the reflectance in the recording bit 111 higher than the reflectance in the space 112.

Such design of the recording layer 102 effectively improves the S/N ratio. The crystalline portion of the recording layer 102 exhibits minute non-uniformity over the area, because the crystalline portion of the recording layer 102 is formed of a group of micro crystals. The minute non-uniformity in the reflectance causes noise. The amorphous portion, on the other hand, exhibits reduced noise. The configuration in which the reflectance of the amorphous portion is high and the reflectance of the crystalline portion is low reduces the level of the light reflected from the portion that causes large noise, and thereby improves the S/N ratio.

The header regions 105 are provided with pre-pits corresponding to the header information. Embossed patterns are formed inside the pre-pits. The embossed patterns reduce the reflectance of the pre-pits below that of the remaining portions of the header regions 105.

One problem of such phase change recording is the reliability in reading out the header information. The optical disk 101 for the phase change recording designed to increase the reflectance of the recording pits have the header region 105 formed within the crystalline portion of the recording layer 102 (namely, the portion where the reflectance is low). The decrease in the reflectance of the header region 105 further decreases the reflectance of the pre-pits formed in the header region 105. This may reduce the level of the optical signal reflected from the header region 105, and reduce the reliability in reading out the header information. FIG. 3 is an example of an eye-pattern of reproduced signals obtained from the optical signals reflected from the header region 105 and the data recording region 106. The reproduced signals are obtained by converting the optical signals into electric signals, cutting the direct current components of the electric signals, and extracting only the alternating current components. As indicated by the eye-pattern, the amplitude of the level of the reproduced signal obtained from the header region 105 is smaller than that of the reproduced signal obtained from the data recording region 106. This deteriorates the reliability in reading the header information written in the header region 105.

The header information (or format information) can be recorded in a wobble groove for tracking, instead of the pre-pits. Recording header information onto the wobble groove is achieved by modulating the wobble pattern of the wobble groove in response to the header information. This method is referred to as a wobble modulation and applied to CD-Rs. However, the wobble modulation intrinsically exhibits a reduced S/N ratio since the amplitude of the wobble pattern is limited. Moreover, the reduction in the S/N ratio is severe for the phase change recording designed to increase the reflectance of recording pits, because this requires forming the wobble groove in the crystalline portion (namely, the portion where the reflectance is low).

A technique for improving the reliability in reading out the header information is disclosed in Japanese Laid Open Patent Application (JP-A No. P2000-311343A). This document discloses a technique of increasing the reproduction amplitude of an address signal (namely, header information) by controlling a disk drive so as to make the level of the light beam used for the reproduction of an address region (namely, a header region) stronger than that of a data region (namely, a data recording region).

Additionally, a technique of improving the degree of the modulation of pre-pit portions is disclosed in Japanese Laid Open Patent Application (JP-A No. P2000-339690A). This document discloses a technique that improves the modulation degree through irradiating a laser beam on pre-pit portions within the recording layer during manufacture so that the pre-pit portions are changed into the recorded state.

DISCLOSURE OF INVENTION

The present invention provides a technique for improving the reliability in reading out header information. Especially, the present invention provides a technique for improving the reliability in reading out the header information through adopting improved optical disk structure.

In one aspect of the present invention, an optical disk is composed of a recording track. The recording track includes data recording regions in which recording pits are formed for recording data, and header regions in which pre-pits are formed for recording header information identifying said data recording regions. Said recording pits have a reflectance larger than that of a space in which said recording pits are not formed. Said recording pits and said pre-pits are formed so that an amplitude (dynamic range) of a level of an optical signal reflected from said header regions is larger than that of an optical signal reflected from said data recording regions.

In order to increase the amplitude of the level of the optical signal reflected from said header regions above that of the level of the optical signal reflected from said data recording regions, the reflectance of the recording layer may be appropriately adjusted. In detail, reflectances of said recording pits within said data recording regions, said space within said data recording regions, said pre-pits within said header regions, and a space within said header regions, where said pre-pits are not formed, may be adjusted so that, when optical beams having the same intensity are irradiated on said data recording regions and said header regions, an amplitude of a level of an optical signal reflected by said header regions is equal to or larger than that of a level of an optical signal reflected by said data recording regions.

Alternatively, the pre-pits may be deeply formed. When said data recording regions include a pregroove in which said recording pits are formed, a depth of said pre-pits is preferably deeper than that of said pregroove; it would be most preferable that the depth of said pre-pits is twice as deep as that of said pregroove.

The recording pits and pre-pits thus constructed effectively reduce errors during detection of the header information recorded as the pre-pits.

In another aspect of the present invention, an optical disk is composed of a recording track including
  data recording regions where recording pits are formed for recording data, and header regions where pre-pits are formed for recording header information identifying said data recording regions. Said recording pits have a reflectance larger than that of a space, where said recording pits are not formed. Said recording pits and said pre-pits are formed so that a signal modulation degree of said header regions is larger than that of said data recording regions. The signal modulation degrees of said header and data recording regions are obtained by dividing the amplitudes of the levels of the optical signals obtained from the respective regions for the case when the optical signals exhibits the maximum repetition rate by the amplitudes of the levels of the optical signals for the case when the optical signals exhibits the minimum repetition rate. Increasing the signal modulation degree of said header regions above that of said data recording regions improves the S/N ratio of the optical signal reflected from the optical disk, as a whole, and thus effectively improves the reliability of the detection of the header information.

The increase in the signal modulation degree of said header regions above that of said data recording regions may be achieved through reducing the linear recording density of said header regions below that of the data recording regions.

When the linear recording density of said header regions is configured to be larger than that of said data recording regions, said recording pits and said pre-pits are preferably formed so that the cycle of the channel clock reproduced from said header regions is n-times as long as that of the channel clock reproduced from said data recording regions. The fact that the linear recording density of said header regions is larger than that of said data recording regions results in the difference in the cycle of the channel clock. Successively reading data from regions exhibiting different cycles of the channel clocks requires time for the synchronization of the clocks; this may cause time when no data can be reproduced from the regions. Configuring the cycle of the channel clock reproduced from said header regions to be n-times as large as that of the channel clock reproduced from said data recording regions facilitates the channel clock synchronization.

When said data recording regions are provided with a wobble groove in which said recording pits are formed, it would be preferable if said pre-pits and said wobble groove are formed so that the cycle of the channel clock reproduced from said header regions to be n-times as large as that of the channel clock reproduced from said data recording regions.

In still another aspect of the present invention, an optical disk is composed of a recording track, the recording track includes data recording regions where recording pits are formed for recording data, and header regions where pre-pits are formed for recording header information identifying said data recording regions. Said recording pits have a reflectance larger than that of a space, where said recording pits are not formed. One of said pre-pits, which is located closest to head of said header regions, has a longer length than the maximum pit length defined by a standard for coding said data. The long pre-pit allows clearly detecting the header regions.

Said header regions may be collectively formed in a leading portion of said recording track disposed in an inner circumference region of said optical disk.

An optical disk reading method in accordance with the present invention is composed of a step of providing a drive including a signal reproducing circuit with the aforementioned optical disk, and a step of configuring characteristics of said signal reproducing circuit for reading said header information recorded in said header regions so that said configured characteristics are different from characteristics used for reading data recorded in said data recording regions. This optical disk reading method allows optimizing the characteristics of the signal reproducing circuit for the header regions. The combination of the optimization of the characteristics of the signal reproducing circuit and the optimization of the structure of the optical disk further improves the reliability of the detection of the header information.

BEST MODE FOR CARRYING OUT THE INVENTION

First Embodiment

Figure 1:
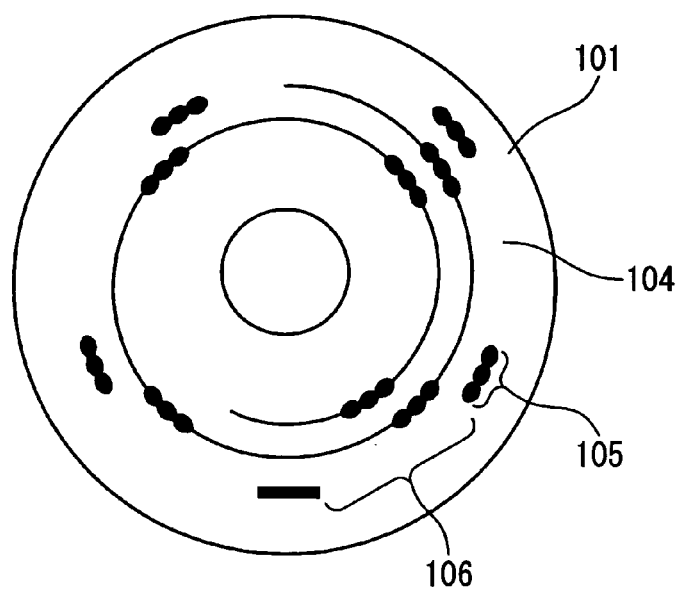
FIG. 1 is a plan view of a conventional optical disk.
Figure 2:
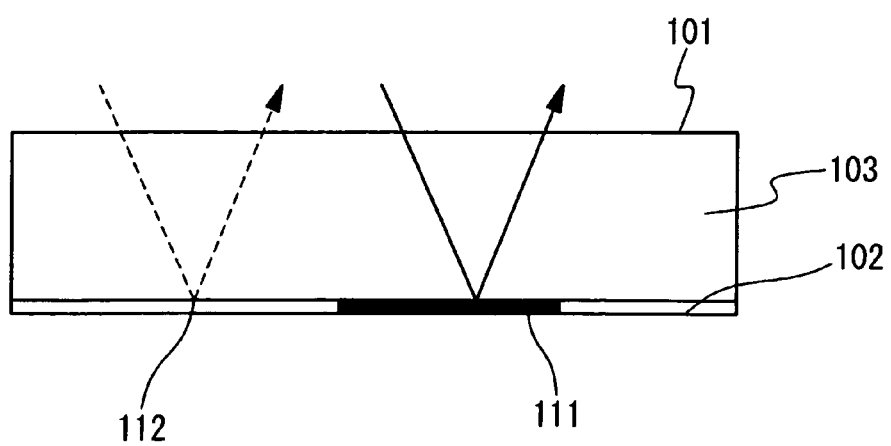
FIG. 2 is a sectional view of the conventional optical disk.
Figure 3:
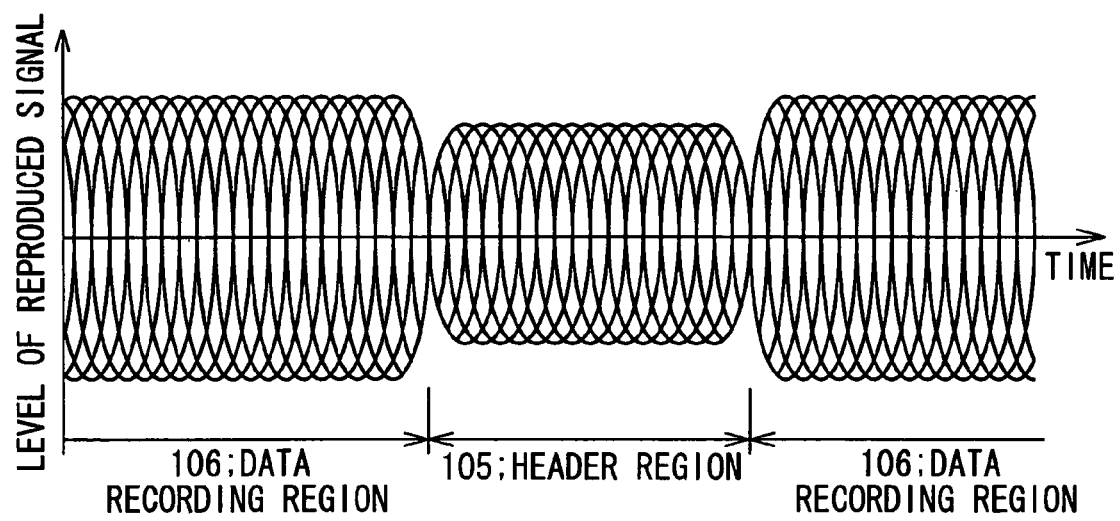
FIG. 3 shows respective eye-patterns of reproduced signals obtained from header regions and data recording regions of the conventional optical disk.
Figure 4:
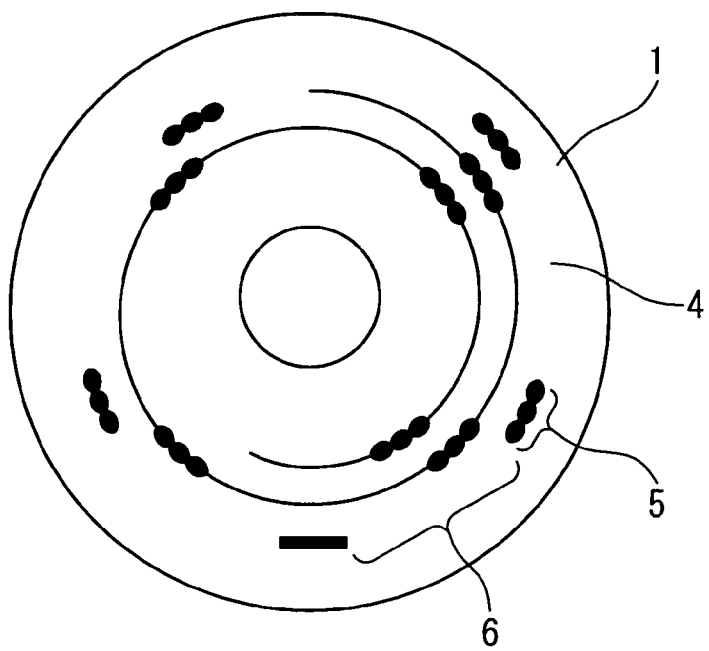
FIG. 4 is a plan view showing embodiments of an optical disk according to the present invention.

An optical disk 1 in a first embodiment of the present invention is composed of a spirally formed recording track 4, as shown in FIG. 4. The recording track 4 is divided into sectors having a predetermined sector length. Each of the sectors includes a header region 5 and a data recording region 6. The header regions 5 are located at the head of the sectors, and the data recording regions 6 are circumferentially adjacent to the header regions 5. Header information including a sector address is recorded in the header regions 5, and user data is recorded in the data recording regions 6.

Figure 5:
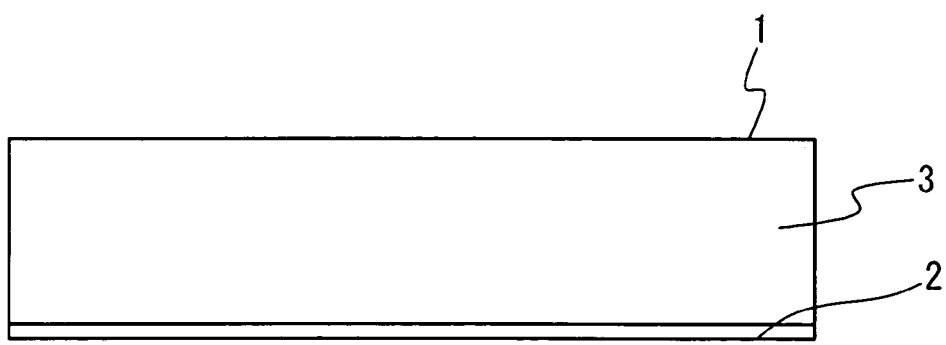
FIG. 5 is a sectional view showing the embodiments of the optical disk according to the present invention.

FIG. 5 shows the cross sectional structure of the optical disk 1. The optical disk 1 includes a transparent substrate 3 and a recording layer 2 covering the transparent substrate 3. The transparent substrate 3 is typically made of polymer plastic such as poly-carbonate and poly-methyl methacrylate. The recording layer 2 is made of phase change recording material which has the reflectance in the amorphous phase higher than the reflectance in the crystalline phase. The recording layer 2 typically includes a first $ZnS—SiO_2$ film, a $Ge_2Sb_2Te_5$ film, a second $ZnS—SiO_2$ film, and an Al—Ti film, which are sequentially laminated on the transparent substrate 3. The film thicknesses of the first $ZnS—SiO_2$ film, the $Ge_2Sb_2Te_5$ film, the second $ZnS—SiO_2$ film and the Al—Ti film are 125 nm, 13 nm, 50 nm, and 200 nm, respectively. Forming the first $ZnS—SiO_2$ film to be sufficiently thick on the transparent substrate 3 allows the reflectance of the amorphous phase to be higher than the reflectance of the crystalline phase.

Figure 6:
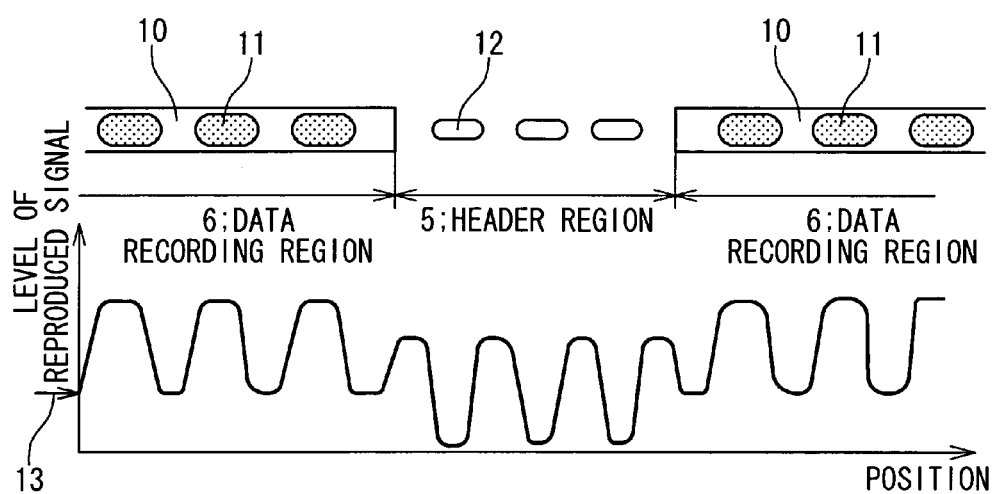
FIG. 6 shows an enlarged view of a recording track in first and second embodiments and an intensity of an optical signal obtained from the recording track.

FIG. 6 is an enlarged view of the recording track 4. A pregroove 10 used for tracking is formed in the data recording regions 6. Recording pits 11 for recording the user data is formed inside the pregroove 10.

In the portions of the data recording regions 6 where the recording pits 11 are formed, the recording layer 2 is made amorphous, while the recording layer 2 is made crystalline in the remaining portion. The reflectance in the recording pits 11 is high due to the high reflectance of the amorphous portion of the recording layer 2. On the other hand, the portion (space) except the recording pits 11, which is referred to as a space, is crystalline in the data recording regions 6, and this reduces the reflectance in the space of the data recording regions 6. Forming the pregroove 10 reduces the reflectance in the spaces of the data recording regions 6 below the intrinsic reflectance of the crystalline phase of the recording layer 2. In FIG. 6, the level of the optical signal reflected from the data recording regions 6 is indicated by an arrow 13.

Pre-pits 12 are formed in the header regions 5. In the recording layer 2, the spaces of the header regions 5 (namely, the portion where the pre-pits 12 are not formed) are in the crystalline phase. Therefore, the spaces of the header regions 5 have the intrinsic reflectance of the crystal phase of the recording layer 2. On the other hand, embossed patterns are formed inside the pre-pits 12. The embossed patterns decrease the reflectance of the pre-pits 12 through interference. Hence, the pre-pits 12 have the reflectance lower than the spaces of the header regions 5.

Therefore, the recording pits 11 formed in the data recording regions 6 have the highest reflectance, and the spaces of the header regions 5 have the second highest reflectance. The spaces of the data recording regions 6 have the third highest reflectance, and the pre-pits 12 formed in the header regions 5 have the lowest reflectance. Hence, as shown in FIG. 6, the level of the optical signal reflected from the recording pits 11 formed in the data recording regions 6 is the highest, and the level of the optical signal reflected from the spaces of the header regions 5 is the second highest. The level of the optical signal reflected from the spaces of the data recording regions 6 is the third highest, and the level of the optical signal reflected from the pre-pits 12 formed in the header regions 5 is the lowest.

The recording pits 11 and the pre-pits 12 are formed so that, when the light beams of the same level are irradiated on the header regions 5 and the data recording regions 6, the amplitude of the level of the optical signal reflected from the header regions 5 (namely, the dynamic range of the optical signal reflected from the header regions 5) is equal to or larger than the amplitude of the level of the optical signal reflected from the data recording regions 6 (namely, the dynamic range of the optical signal reflected from the data recording regions 6).

Figure 7:
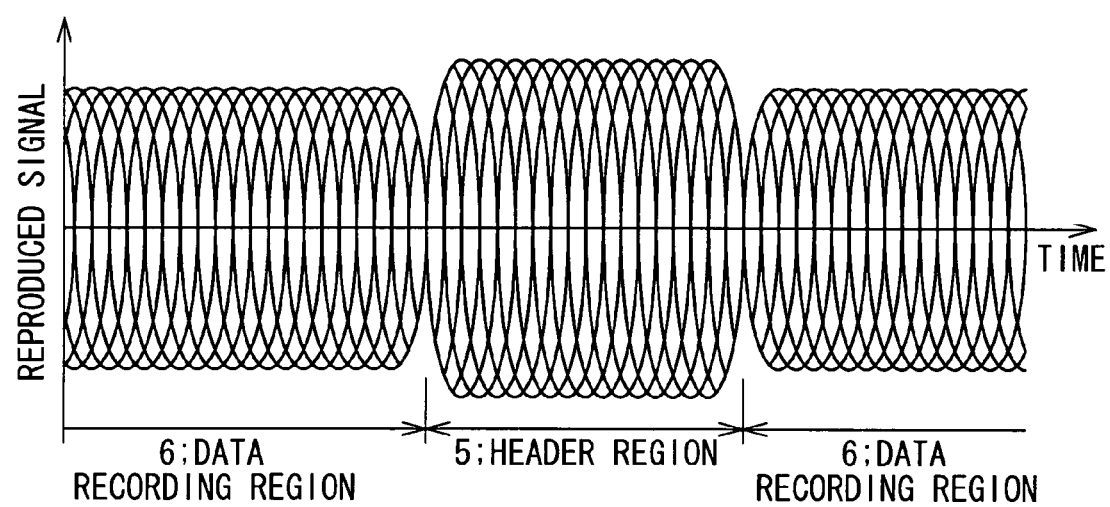
FIG. 7 shows an eye-pattern of a reproduced signal obtained from the recording track.

Such configuration allows the amplitude of the reproduction signal obtained from the header regions 5 to be sufficiently large. FIG. 7 is an example of the eye-pattern of the reproduced signals obtained from the header regions 5 and the data recording regions 6. The reproduced signals are obtained by converting the optical signals reflected from the header regions 5 and the data recording regions 6 into electric signals, cutting the direct current components of the electric signals, and extracting only the alternating current components. As indicated by these eye-patterns, the amplitude of the reproduced signal obtained from the header regions 5 is sufficiently increased. The sufficiently large amplitude of the reproduction signal obtained from the header regions 5 improves the reliability in reading out the header information recorded in the header regions 5.

In order to increase the amplitude of the level of the optical signal reflected from the header regions 5 above the amplitude of the levels of the optical signal reflected from the data recording regions 6, the reflectances of the recording pits 11, the pre-pits 12, and the spaces are properly adjusted in the header regions 5 and the data recording regions 6. The amplitude of the level of the optical signal reflected from the header regions 5 depends on the reflectances of the pre-pits 12 and the space in the header regions 5, and the amplitude of the level of the optical signal reflected from the data recording regions 6 depends on the reflectances of the recording pit 11 and the space in the data recording regions 6. Therefore, adjusting the reflectances of the recording pits 11, the pre-pits 12 and the spaces in the header regions 5 and the data recording regions 6 increases the amplitude of the level of the optical signal reflected from the header regions 5 above the amplitude of the level of the optical signal reflected from the data recording regions 6. The larger difference in between the reflectances between the recording pits 11 and the spaces within the data recording regions 6 is preferable for recording the user data onto the data recording regions 6. However, in order to sufficiently increase the amplitude of the level of the optical signal reflected from the header regions 5, it is important not to excessively decrease the reflectance of the spaces of the data recording regions 6. If the reflectance of the spaces of the data recording regions 6 is excessively low, the amplitude of the level of the optical signal reflected from the data recording regions 6 becomes small. The reflectance of the space of the data recording regions 6 needs to be properly selected on the basis of the amplitude of the level of the optical signal reflected from the data recording regions 6. If a typical phase change material is used for the recording layer 2, the reflectance of the spaces in the data recording regions 6 preferably ranges between 5 to 15%.

Alternatively, the amplitude of the level of the optical signal reflected from the header regions 5 may be increased above the amplitude of the level of the optical signal reflected from the data recording regions 6 through increasing the depth of the pre-pits 12 of the header regions 5 to be larger than the depth of the pregroove 10 of the data recording regions 6. The pregroove 10 is formed at the depth of about ⅛ of the wavelength at which a push-pull signal used for detecting a tracking error becomes maximum. In order to maximize the signal amplitude, the pre-pits 12 are formed so that the pre-pits 12 have a depth as close as possible to the depth of about ¼ of the wavelength. The optimization of the depth of the pre-pits 12 allows the reflectance in the pre-pits 12 to be substantially close to 0, and thereby enables the maximization of the amplitude of the level of the optical signal reflected from the header regions 5.

Second Embodiment

In a second embodiment, the recording pits 11 and the pre-pits 12 are formed such that a signal modulation degree of the header regions 5 is larger than a signal modulation degree of the data recording regions 6; the signal modulation degree of a certain region is the value obtained by dividing the amplitude of the level of the optical signal reflected from the region for the case that the pits and the space that respectively have the shortest pit length and the shortest space length, which are defined by a standard, are alternately arranged in the specific region, by the amplitude of the optical signal level reflected from the region for the case that the pits and the space that respectively have the longest pit length and the longest space length, which are defined by the standard, are alternately arranged in the region. In general, the pit length and the space length are limited to specific ranges when data is recorded in optical disks. For example, for the 8/16 code, which is applied to DVDs, the shortest pit length is defined as being 3T, and the longest pit length is defined as being 11T, where T is a pit length corresponding to a cycle of a channel clock. The limits of the pit length and the space length are required to reproduce a clock from data recorded in an optical disk.

Alternately arranging the pits having the shortest pit length and the spaces having the shortest space length in a specific region involves that an optical signal having the highest repetition rate is reflected from the region. Additionally, alternately arranging the pits having the longest pit length and the spaces having the longest space length in a specific region involves that an optical signal having the lowest repetition rate is reflected from the region.

Figure 8:
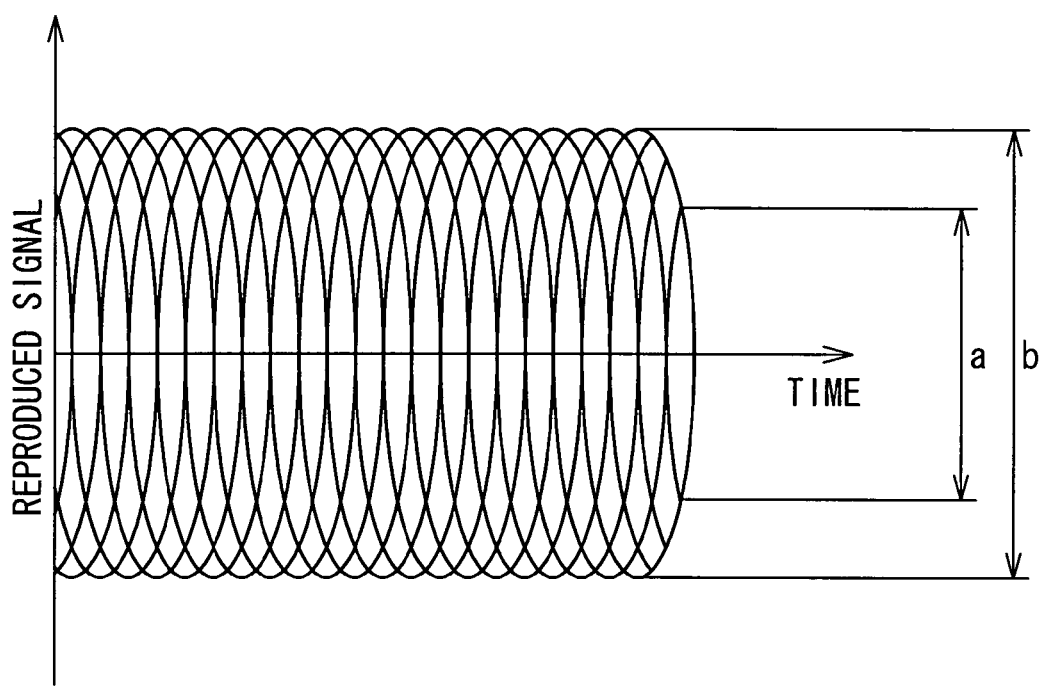
FIG. 8 shows an eye-pattern of a reproduced signal obtained from the recording track.

The arrangement of the pits and spaces for providing an optical signal with the highest repetition rate minimizes the amplitude of the level of the reflected optical signal, while the arrangement of the pits and spaces for providing an optical signal with the lowest repetition rate maximizes the amplitude of the level of the reflected optical signal. FIG. 8 is an eye-pattern of reproduced signals obtained from optical signals reflected from regions where pits and spaces having various pit lengths and space lengths are arranged. The ratio a/b between the smallest amplitude of the reproduced signal, denoted by variable a, and the largest amplitude of the reproduced signal, denoted by a, corresponds to the signal modulation degree of the region. The increase in the signal modulation degree increases the S/N ratio of the reproduction signal, and thereby enables data reproduction with high reliability.

The signal modulation degrees of the header regions 5 and the data recording regions 6 are adjustable with the widths and lengths of the recording pits 11 and the pre-pits 12. Additionally, the signal modulation degrees of the header regions 5 and the data recording regions 6 are adjustable through differentiating the widths of the recording pits 11 and pre-pits 12 having short pit lengths from the widths of the recording pits 11 and pre-pits 12 having long pit lengths.

When the optical disk in this embodiment is reproduced, which is designed so that the signal modulation degree of the header regions 5 is larger than the signal modulation degree of the data recording regions 6, the gain of an amplifier for amplifying an electric signal outputted from a pickup receiving the optical signals reflected from the header regions 5 and the data recording regions 6 is adjusted so that the amplitudes of the reproduced signals obtained from the header regions 5 and the data recording regions 6 are approximately constant. It would be easily achieved with a relatively simple circuitry to adjust the gain so that the amplitudes of the reproduction signals obtained from the header regions 5 and the data recording regions 6 are controlled to be approximately constant. The reliability in reading out the header information recorded in the header regions 5 is improved through increasing the signal modulation degree of the header regions 5 under the conditions that the amplitudes of the reproduction signals obtained from the header regions 5 and the data recording regions 6 are controlled to be approximately constant.

The linear recording density of the header regions 5 may be set to be lower than the linear recording density of the data recording regions 6 in order to increase the signal modulation degree of the header regions 5 above the signal modulation degree of the data recording regions 6. The signal modulation degree is increased as the increase in the linear recording density when the same encoding method is used in the header regions 5 and the data recording regions 6. Decreasing the linear recording density of the header regions 5 below the linear recording density of the data recording regions 6 is preferable, because this makes it easy to increase the signal modulation degree of the header regions 5 above the signal modulation degree of the data recording regions 6.

When the channel clock is reproduced from the data recorded in the optical disk, the fact that the record line density of the header regions 5 and the record line density of the data recording regions 6 are different brings about a new problem that the cycles of the channel clocks are different between those regions. When the cycle of the channel clock of the data recording region 6 differs from that of the header regions 5, the time while no data is reproduced may be observed upon switching the region where the data is reproduced from the header regions 5 to the data recording regions 6. Similarly, when the cycle of the channel clock of the header regions 5 differs from that of the data recording regions 6, the time while no data is reproduced may be observed upon switching the region where the data is reproduced from the data recording regions 6 to the header regions 5. This is because the difference in the cycle of the channel clock may necessitate the time for establishing the synchronization of the clocks.

In order to avoid the desynchronization of the clock, the cycle of the channel clock reproduced from the header regions 5 is set to be integer times as long as the cycle of the channel clock reproduced from the data recording regions 6. That is, the cycle of the channel clock reproduced from the header regions 5 is set to nT, where T is the cycle of the channel clock reproduced from the data recording regions 6, and n is the integer of 2 or more. In order to minimize the difference of the cycles of the channel clocks, the cycle of the channel clock reproduced from the header regions 5 is set to 2T.

The data reproduction is achieved without desynchronization through setting the cycle of the channel clock reproduced from the header regions 5 to be the integer times as long as the cycle of the channel clock reproduced from the data recording regions 6.

The cycle of the channel clock reproduced from the header regions 5 and the cycle of the channel clock reproduced from the data recording regions 6 may be adjusted so as to satisfy the above-mentioned condition on the basis of the arrangement of the pre-pits 12 of the header regions 5 and the arrangement of the recording pit 11 of the data recording regions 6, respectively.

Additionally, for the case when a wobble groove is used as the pregroove 10 of the data recording regions 6, the wobbling cycle of the wobble groove may be adjusted so that the cycle of the channel clock reproduced from the data recording regions 6 satisfies the above-mentioned condition. The wobble groove is wobbled at a cycle corresponding to the cycle of the channel clock multiplied by an integer, and the channel clock is reproduced from the wobbled wobble groove. In this case, adjusting the wobbling cycle of the pregroove 10 formed in the data recording regions 6 so that the wobbling cycle corresponds to the cycle of the channel clock of the header regions allows the data recorded in both of the header regions 5 and the data recording regions 6 to be reproduced by using the clock reproduced from the pregroove 10.

Third Embodiment

Figure 9:
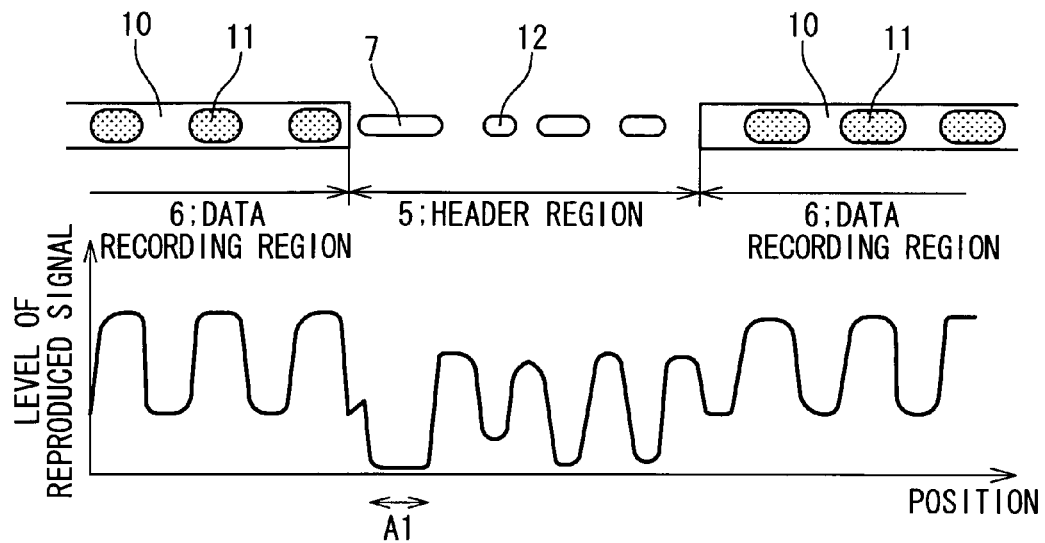
FIG. 9 shows an enlarged view of a recording track in a third embodiment and an intensity of an optical signal obtained from the recording track.

In a third embodiment, as shown in FIG. 9, long pre-pits (recognition pits 7) are formed at the head of the header regions 5 so that a driver can surely detect the header regions 5. The recognition pits 7 are embossed, and thus the reflectance of the recognition pits 7 are lower than the reflectance of the spaces of the data recording regions 6, as is the case of the pre-pits 11.

Conventionally, the highly reflective spaces having a predetermined length are formed in the header regions of optical disks, and the disk drives find the header regions through detecting the highly reflective spaces. In optical disks where highly reflective recording pits are formed, however, the reflectance of the spaces is not always the highest. Thus, this method cannot be applied to optical disks where the highly reflective recording pits are formed.

For this reason, in the third embodiment, the long recognition pits 7 are formed at the head of the header regions 5, and the recognition pits 7 are used to recognize the header regions 5.

The recognition pits 7 have a length longer than the longest pit length defined by the standard used for coding data to be recorded in the data recording regions 6. The fact that the recognition pits 7 are longer than the longest pit length enables the recognition pits 7 to be distinguished from the pits representing the data. Reproducing data from the header regions 5 including the long recognition pits 7, as shown in FIG. 9, allows the reproduced signal to have a reduced level associated with the recognition pits 7 for a time period Al of a certain duration. This facilitates the recognition of the header regions 5.

The optical disks of the first to third embodiments are reproducible with a disk drive composed of a commonly used signal reproducing circuit. In order to further improve the reliability of the reproduction of the header information, the characteristics of the signal reproducing circuit used to reproduce the header information recorded in the header regions 5 is preferably different from the characteristics of the signal reproducing circuit used to reproduce the data recorded in the data recording regions 6. It would be preferable that the characteristics of the signal reproducing circuit of the disk drive is properly adjusted on the basis of the difference between the reproduction signal amplitudes obtained from the header regions 5 and the data recording regions 6, the difference between the signal modulation degrees and the difference between the cycles of the channel clocks. The optimization of the characteristics of the signal reproducing circuit accompanied by the improvement of the property of the optical disk further improves the reliability of the reproduction of the header information.

Although the present invention has been explained above with reference to the various embodiments, it does not intend that the present invention is limited to these embodiments. Those skilled in the art would appreciate that changes may be allowed within the spirit of the present invention.

For example, the recording track is not always formed only inside the pre-groove; the recording tracks may be formed in both of the grooves and the lands between these grooves.

Figure 10:
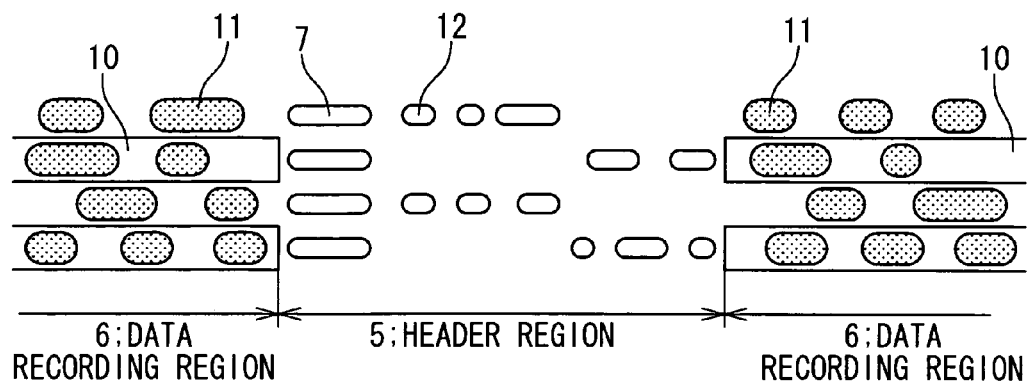
FIG. 10 is a plan view showing a modification of the third embodiment.
Figure 11:
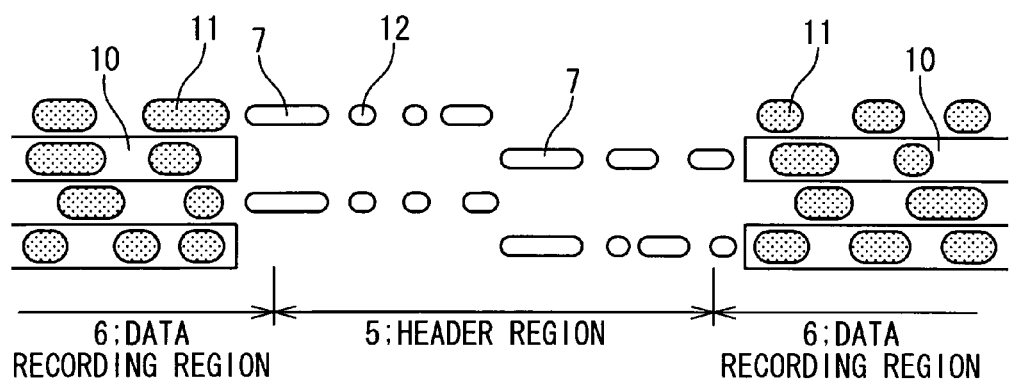
FIG. 11 is a plan view showing another modification of the third embodiment.
Figure 12:
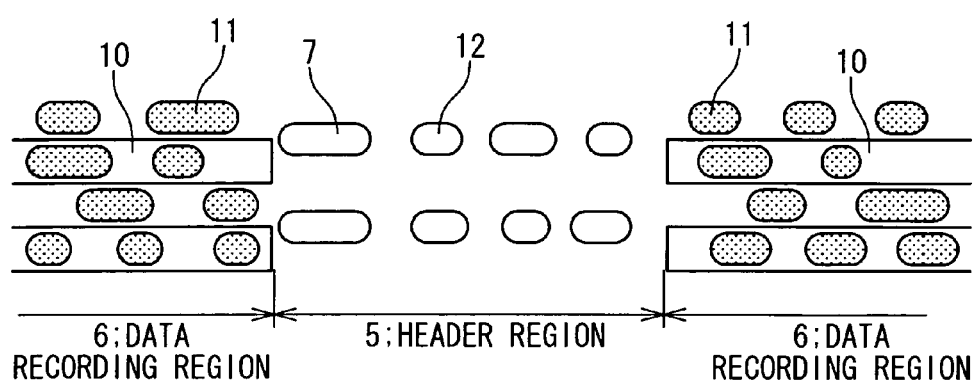
FIG. 12 is a plan view showing still another modification in the third embodiment.

FIGS. 10 to 12 illustrate modifications of the third embodiment, in which the recording tracks are formed in both of the groove and the land. As shown in FIGS. 10 and 11, the pre-pits 12 formed in the header regions 5 of the land recording track may be displaced from the pre-pits 12 formed in the header regions 5 of the groove recording track. This is effective for avoiding interference between the adjacent recording tracks. The recognition pits 7 may be arranged at the head of the header regions 5, as shown in FIG. 10. Alternatively, as shown in FIG. 11, the recognition pits 7 may be arranged at the head of the pre-pits 12 representing the header information.

Moreover, as shown in FIG. 12, the pre-pits 12 indicating the header information may be formed so as to overlap with a pair of a land recording track and a groove recording track. In this case, the header information is commonly used in the land recording track and the groove recording track. When the pre-pits 12 overlap with the land recording track and the groove recording track, the recognition pits 7 may be also formed so as to overlap with the land recording track and the groove recording track. The recognition pits 7 may be formed for each recording track, and the pre-pits 12, indicating the header information, may be formed so as to overlap with the land recording track and the groove recording track.

Also, those skilled in the art would appreciate that the header region 5 in a certain pair of a land recording track and a groove recording track may be displaced from the header region 5 in another pair of a land recording track and a groove recording track.

Moreover, those skilled in the art would appreciate that the pre-pits may be discretely formed in the land provided beside the groove recording track, as is the case for DVD-Rs. When the pre-pits are formed at the portion other than the center of the recording track, the header information may be read out on the basis of the change in the push-pull signal in place of the change in the reflected optical signal. In this case, the present invention may be applied with regard to the amplitudes of the levels of the optical signals received by the two optical detectors generating the push-pull signal.

Moreover, the recording data may be multiplexedly written onto the header regions where the pre-pits are formed. The present invention applies to this configuration. When the recording pits are formed in the header regions, the effective signal can be detected from a pre-pit reproduction signal obtained from the spaces between the recording pits and the like.

Although the above-mentioned explanations assume that short header regions are cyclically formed in the recording track, the header regions may be collectively formed in the inner circumference region of the optical disk, which is the leading portion of the recording track on the entire optical disk. In this case, the header regions may be removed from the recording tracks except the inner circumference region. Instead, short header regions containing the address information, which is minimumly required, may be cyclically left.

As thus described, even if the header regions are collectively formed in the inner circumference portion, this portion is covered with the recording medium having a reduced reflectance; therefore, applying the present invention enables the stable information reproduction.

The invention claimed is:

1. An optical disk comprising:
    a recording track including:
        data recording regions where recording pits are formed for recording data; and
        header regions where pre-pits are formed for recording header information identifying said data recording regions,
    wherein said recording pits have a reflectance larger than that of a space, where said recording pits are not formed,
    wherein said recording pits and said pre-pits are formed such that, when optical beams having the same intensity are irradiated on said data recording regions and said header regions, an amplitude of a level of an optical signal reflected by said header regions is one of equal to and greater than that of a level of an optical signal reflected by said data recording regions,
    wherein the recording pits formed in the data recording regions have a highest reflectance,
    wherein said space in the header regions have a second highest reflectance,
    wherein said space in the data recording regions have a third highest reflectance, and
    wherein said pre-pits formed in the header regions have a lowest reflectance.

2. The optical disk according to claim 1, wherein said data recording regions include a pregroove in which said recording pits are formed, and a depth of said pit-pits is deeper than that of said pregroove.

3. The optical disk according to claim 2, wherein said depth of said pre-pits is twice as deep as that of said pregroove.

4. The optical disk according to claim 1, wherein said header regions are collectively formed in a leading portion of said recording track disposed in an inner circumference region of said optical disk.

5. An optical disk comprising:
    a recording track including:
        data recording regions where recording pits are formed for recording data; and
        header regions where pit-pits are formed for recording header information identifying said data recording regions,
    wherein said recording pits have a reflectance larger than that of a space, where said recording pits are not formed,
    wherein said recording pits and said pre-pits are formed such that a signal modulation degree of said header regions is greater than that of said data recording regions,
    wherein the recording pits formed in the data recording regions have a highest reflectance,
    wherein said space in the header regions have a second highest reflectance,
    wherein said space in the data recording regions have a third highest reflectance, and
    wherein said pre-pits formed in the header regions have a lowest reflectance.

6. The optical disk according to claim 5, wherein a linear recording density of said header regions is lower than that of said data recording regions.

7. The optical disk according to claim 6, wherein said recording pits and said pre-pits are formed such that a cycle of a channel clock reproduced from said header regions is n-times as long as that of a channel clock reproduced from said data recording regions, n being an integer one of equal to and greater than 2.

8. The optical disk according to claim 6, wherein said data recording regions include a wobble groove in which said recording pits are formed, and
    wherein said pre-pits and said wobble groove are formed such that a cycle of a channel clock reproduced from said header regions is n-times as long as that of a channel clock reproduced from said data recording regions, n being an integer one of equal to and greater than 2.

9. The optical disk according to claim 5, wherein said header regions are collectively formed in a leading portion of said recording track disposed in an inner circumference region of said optical disk.

10. An optical disk comprising:
    a recording track including:
        data recording regions where recording pits are formed for recording data; and header regions where pre-pits are formed for recording header information identifying said data recording regions, wherein said recording pits have a reflectance larger than that of a space, where said recording pits are not formed, wherein one of said pit-pits which is located closest to a head of said header regions has a longer length than the maximum pit length defined by a standard for coding said data, wherein the recording pits formed in the data recording regions have a highest reflectance, wherein, said space in the header regions have a second highest reflectance, wherein said space in the data recording regions have a third highest reflectance, and wherein said pre-pits formed in the header regions have a lowest reflectance.

11. An optical disk reading method comprising:

providing a drive including a signal reproducing circuit with an optical disk including:

a recording track comprising:

data recording regions comprising recording pits formed for recording data, said recording pits having a reflectance larger than that of a space, where said recording pits are not formed; and header regions comprising pre-pits formed for recording header information identifying said data recording regions, said recording pits and said pre-pits being formed such that, when optical beams having the same intensity are irradiated on said data recording regions and said header regions, an amplitude of a level of an optical signal reflected by said header regions is one of equal to and greater than that of a level of an optical signal reflected by said data recording regions; and configuring characteristics of said signal reproducing circuit for reading said header information recorded in said header regions such that said configured characteristics are different from characteristics used for reading data recorded in said data recording regions, wherein the recording pits formed in the data recording regions have a highest reflectance, wherein said space in the header regions have a second highest reflectance, wherein said space in the data recording regions have a third highest reflectance, and wherein said pre-pits formed in the header regions have a lowest reflectance.

12. An optical disk reading method comprising:

providing a drive including a signal reproducing circuit with an optical disk including:

a recording track comprising:

data recording regions comprising recording pits formed for recording data, said recording pits having a reflectance larger than that of a space, where said recording pits are not formed; and header regions comprising pre-pits formed for recording header information identifying said data recording regions, said recording pits and said pre-pits being formed such that a signal modulation degree of said header regions is greater than that of said data recording regions; and configuring characteristics of said signal reproducing circuit for reading said header information recorded in said header regions such that said configured characteristics are different from characteristics used for reading data recorded in said data recording regions, wherein the recording pits formed in the data recording regions have a highest reflectance, wherein said space in the header regions have a second highest reflectance, wherein said space in the data recording regions have a third highest reflectance, and wherein said pre-pits formed in the header regions have a lowest reflectance.

13. An optical disk reading method comprising:

providing a drive including a signal reproducing circuit with an optical disk including:

a recording track including:

data recording regions comprising recording pits formed for recording data, said recording pits having a reflectance larger than that of a space, where said recording pits are not formed; and header regions comprising pre-pits formed for recording header information identifying said data recording regions, wherein one of said pre-pits which is located closest to a head of said header regions has a longer length than the maximum pit length defined by a standard for coding said data; and configuring characteristics of said signal reproducing circuit for reading said header information recorded in said header regions such that said configured characteristics are different from characteristics used for reading data recorded in said data recording regions, wherein the recording pits formed in the data recording regions have a highest reflectance, wherein said space in the header regions have a second highest reflectance, wherein said space in the data recording regions have a third highest reflectance, and wherein said pre-pits formed in the header regions have a lowest reflectance.

* * * * *